Inventor:
Albert Kalin

Patented June 18, 1940

2,205,265

UNITED STATES PATENT OFFICE 2,205,265

SYNCHROPHASING SYSTEM

Albert Kalin, Rockford, Ill., assignor to Woodward Governor Company, Rockford, Ill., a corporation of Illinois Application May 24, 1937, Serial No. 144,442
Renewed June 5, 1939

23 Claims. (Cl. 60—97)

This invention relates to a synchrophasing system for synchronizing and phasing two or more prime movers such as steam turbines, electric motors, and Diesel and other internal combustion engines.

This application is a continuation in part of my copending application Serial No. 78,869, filed May 9, 1936. In said earlier application, I disclosed a synchrophasing system applied to the two main propulsion engines of a multiple screw ship to synchronize the same through interconnected speed governors, so that any desired instantaneous phase angle could be maintained between the main crank-shafts indefinitely under normal cruising conditions. It was also indicated there that the system could be applied to prime movers generally, not only on sea-going ships and yachts, but airplanes and dirigibles, and wherever a similar problem of synchronizing and phasing might be presented, as, for example, the synchronization of various parts of a paper making machine, the synchronization of the pump-driving engines or motors in oil or other pipe lines, the reduction of vibration in a ship due to unbalanced propeller action by offsetting irregularity of one propeller against the irregularity of another by proper phase adjustment thereof while in synchronism, etc. The present application is concerned with the same system, but simply applied to the synchronizing and phasing of any desired number of subservient or subordinate units with a master unit.

The invention is illustrated in the accompanying drawings, in which—

Similar reference numerals are applied to corresponding parts throughout the views.

Figure 1:
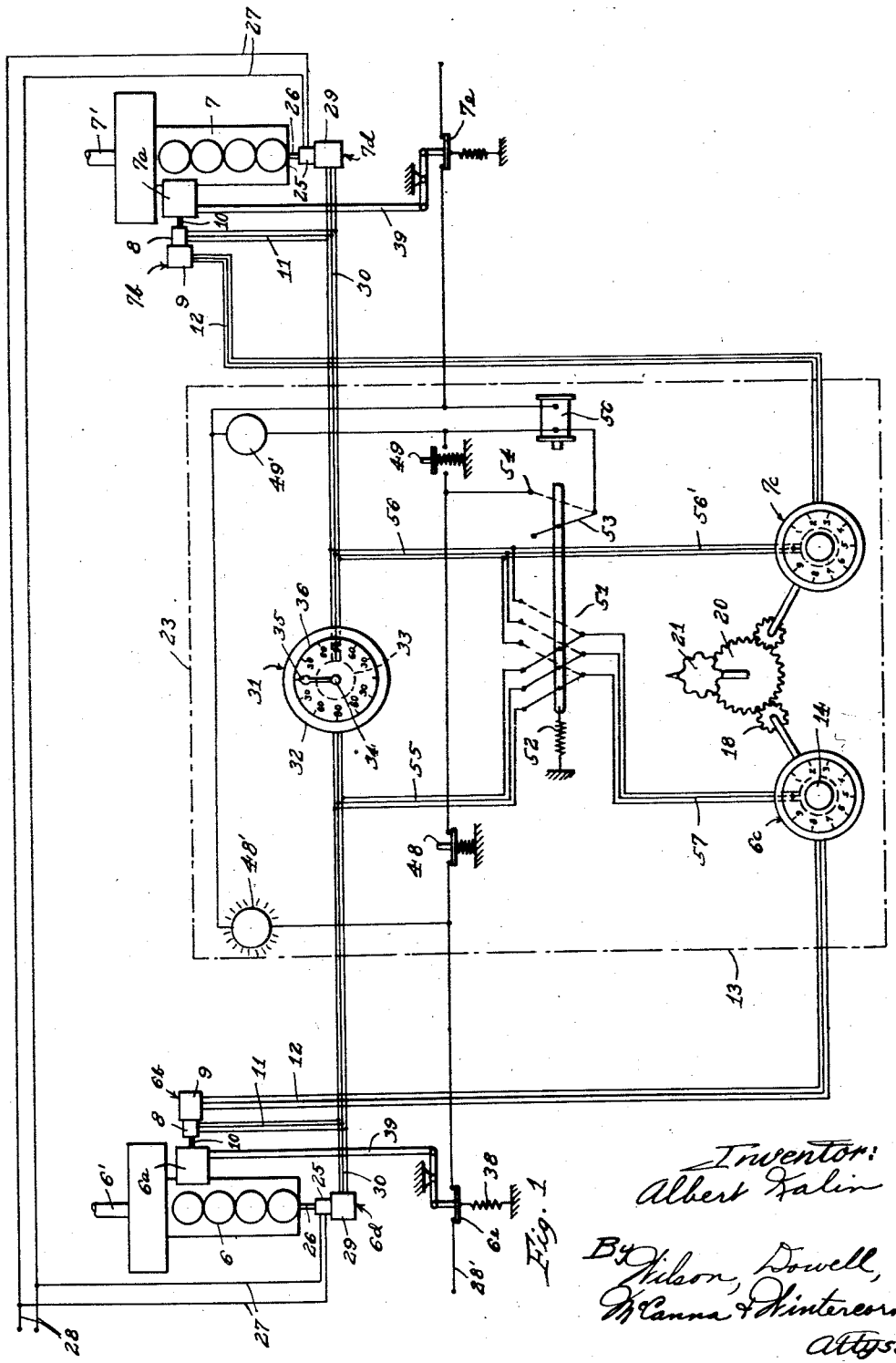
Figure 1 is a wiring diagram of the system.

Referring first to Fig. 1, it should be understood that the two prime movers 6 and 7 which are to be controlled so as to operate in synchronism and exact phase, or some special phase relationship desired, may be any of the types previously mentioned in any of the installations referred to. For example, 6 and 7 may be the main propulsion engines of a multiple screw ship, the crank-shafts 6' and 7' being connected through the usual transmission with the propeller screws for forward or reverse drive. These engines may be any type of internal combustion engines but are here intended to be of the Diesel type controllable as to speed by operation of their throttles by means of isochronous governors 6a and 7a, as disclosed in my copending application Serial No. 27,037, filed June 17, 1935, now patent No. 2,117,891. The governors, the flyball mechanisms of which are driven by the engines, as disclosed in said application, are subject to adjustment to regulate the speed of the engines by increasing or decreasing the pressure of the speeder springs in the fly-ball mechanisms of the governors, as also clearly set forth in said application. Furthermore, in accordance with said application, the speed adjustment for the governors is arranged to be effected by means of A. C. position-receivers or self-synchronizing motors 6b and 7b, known commercially as "selsyn" motors. 8 and 9 designate the primary and secondary of these motors, 8 in this case being the rotor and 9 the stator, as diagrammatically illustrated in the drawings, 10 being the shaft connecting the rotor 8 with the speeder spring adjustment in the associated governor. At 11 are indicated the three wires which extend to the usual three brushes of the rotor 8, and at 12 the three wires which extend from the stator, the motors 6b and 7b being what are known as "differential" type. Two other self-synchronizing motors or position-transmitters 6c and 7c of the differential type are provided in a control cabinet 13 for remote control of the motors 6b and 7b, respectively, whereby to effect remote control of the governors 6a and 7a, respectively, as further described in the aforesaid application. The wires 12 interconnect the stators of motors 6b and 6c, on the one hand, and motors 7b and 7c on the other hand, so that when the rotor of motor or position-transmitter 6c or 7c is turned, the rotor of the associated motor or position-receiver 6b or 7b will be turned correspondingly by reason of the voltage induced by transformer action in the stator of the initial motor.

As disclosed in the parent application, a dial or knob 14 is provided in connection with each of the motors or position-transmitters 6c and 7c so that the rotors thereof may be turned by hand. Pinions 18 turned with the dials and rotors by frictional connection therewith, as disclosed in my application Serial No. 78,869, mesh with a gear 20 arranged to be turned by a master control dial or knob 21 similarly frictionally connected therewith. For the present purpose it may be assumed that the pinions 18 are frictionally mounted on their shafts, and the gear 20 is frictionally mounted on its shaft with greater frictional resistance to turning relative to the shaft than either pinion. The arrangement as fully described in the last named application is such that either of the dials 14 may be adjusted independently of the dial 21, but, when the dial 21 is turned, the two dials 14 turn with it. In that way, one may slow down or speed up either engine by remote control by turning the associated dial 14 in a counter-clockwise direction in slowing down and in a clockwise direction in speeding up, the adjustment of either dial leaving the adjustment of the other dial unaffected. If both dials are turned simultaneously in a clockwise direction, the engines will accordingly be speeded up simultaneously, and vice versa. The dial 21 is used for speeding up or slowing down both engines simultaneously.

The synchronization of the engines should be clear from the foregoing description, and I shall now describe how the engines may be brought into phase so that the cranks of the shafts 6' and 7' will have the same instantaneous angularity. This is accomplished by providing standard self-synchronizing generators or position-transmitters 6d and 7d, the primary or rotor 25 of each of which is driven by the engine through any suitable power take-off, although a direct connection is shown at 26 with the crank-shaft. The two wires shown at 27 connected to two brushes engaging the rotor 25 are connected with a source 28 of 110 volt, 60 cycle, alternating current. The secondary or stator 29 has three wires extending therefrom, as indicated at 30, connected with the wires 11, previously referred to, whereby to afford a source of excitation for the motors 6b and 7b. The wires 30 also extend to the control cabinet 13 where the wires from one of the position-transmitters 6d—7d are connected with the stator 32 of a differential self-synchronizing motor or position-receiver 31, the wires 30 from the other position-transmitter being connected with the brushes cooperating with the rotor 33 of the position-receiver 31. The armature shaft 34 of the motor has a pointer or needle 35 turning with respect to a dial 36 on the front panel 23 of the control cabinet. When one of the engines is operated alone, the needle 35 turns at the same speed as the crank-shaft, owing to the fact that the rotor 25 is electrically coupled with the rotor 33 by interconnection of position-transmitters 6d and 7d with position receiver 31. Now, if the other engine is started running, the needle 35 will slow down more and more as the second engine is speeded up more and more until finally when the second engine reaches the same speed as the first engine, the needle 35 will stand still. Furthermore, the position at which the needle 35 comes to a standstill is an indication of the angle relationship of the cranks of the two engines; in the "12 o'clock" position, indicated in Figs. 1 and 2, the corresponding cranks of shafts 6' and 7' have the same instantaneous angle, that is, they are exactly in phase. One can by manipulation of the dials 14 speed up one engine to match the speed of the other, or slow down one engine to the speed of the other to bring the needle 35 to a standstill. Then after the needle has been brought to a standstill, if it happens to be say at a "3 o'clock" or "9 o'clock" position, showing a crank-shaft angle difference of 90° between the two engines, it is obvious that the two engines can be brought into phase as well as synchronism by momentarily varying the speed of either one or both engines. In particular, if the engines are in synchronism, but out of phase, with the crank shaft of engine 6 leading that of the engine 7 then the speed of the engine 6 can be momentarily checked and then returned to its previous speed. This momentary checking of the speed of the engine 6 will, of course, cause its crank shaft to occupy a somewhat more delayed angular position. In this way the angular position of the crank shaft of engine 6 with respect to that of the engine 7 can be gradually changed until the needle 35 indicates that the two are in phase. Similarly, under the conditions assumed, the engine 7 could be momentarily speeded up and then returned to its previous speed setting with a consequent change in the angular position of its crank shaft with respect to that of the engine 6, so that the two crank shafts are finally brought into phase by this type of adjustment. If desired, the two engine speeds may be momentarily changed in opposite senses simultaneously so as to more quickly accomplish the desired phasing operation. In any event, the engines are finally restored to their previous speeds so that they will continue to operate in synchronism as they were doing at the beginning of the phasing operation.

In the parent application, the control of the engines 6 and 7 was considered primarily with relation to the requirements when the engines are used as the main propulsion engines of a multiple screw ship, or the like, and I disclosed in that application how the speed of the two units was kept balanced and how any desired instantaneous phase angle between the crank-shafts could be maintained indefinitely in any ordinary seaway without any need for manual control or regulation. In the present case, however, the system is modified to such an extent that the two engines no longer merely match one another, but the one engine becomes the "master" and the other the "subordinate" or "subservient" engine, and, as will presently appear, the master engine may have any number of engines subordinate thereto. It is only for the sake of simplicity that only one subordinate engine 6 is shown in Fig. 1 with the master engine 7.

28' in Fig. 1 designates a source of direct current supply similarly as in the parent application, and switches 6e and 7e in the line 28' are normally held open by springs 38, but are arranged to be closed automatically when the engines are on governor control, 39 representing a connection between each governor and its related switch, holding the switch closed against the action of its spring 38. Two push-button switches 48 and 49 are also included in the line 28', the former being normally closed and the latter normally open. These switches are provided on the panel 23 of the control cabinet, and two electric lights 48' and 49' are provided adjacent the same, the former a green light and the latter a red light, for signal purposes. When the two engines are operating on governor control, a circuit is completed through the green light 48'. The switch 49, when closed, completes a circuit through a solenoid 50 to shift the switch 51 against the action of its spring 52 from the full line position shown in Fig. 1 to the dotted line position and also complete a circuit through the blade 53 and contact 54 through a shunt circuit around the switch 49 so as to keep the solenoid 50 energized thereafter, even though the switch 49 is allowed to open. When switch 49 is closed, red light 49' is lighted and remains on so long as shunt circuit 53—54 remains closed, keeping the solenoid 50 energized. Switch 48 can be opened at will to open the circuit through the solenoid 50 and thus allow the switch 51 to be thrown back under spring action to the full line position. The three wires at 55 and 56 are connected to the wires 30 leading to the motor 31. These wires are connected to the terminals on one side of the switch 51, the wires 56 continuing, as at 56', for connection with the motor 7c, and other wires 57 being provided between the terminals on the other side of the switch 51 and the motor 6c.

Figure 2:
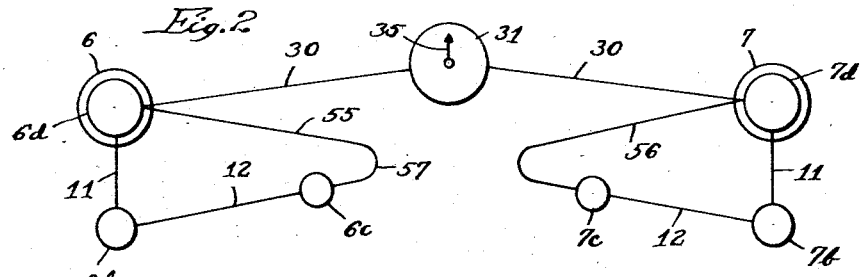
Fig. 2 is a skeleton diagram of Fig. 1, illustrating one condition of operation where the two engines are operating independently.

In operation, viewing Figs. 1 and 2, the green light 48' signals that both engines 6 and 7 are on separate governor control, the switches 6e and 7e being closed automatically by the governors so long as they are controlling the engine throttles. The red light 49' appears only when the switch 49 is closed to interconnect the governor of engine 6 with the governor of engine 7, as in Fig. 4 and as indicated in dotted lines at 51 in Fig. 1. Before the switch 49 is closed and while the switch 51 is still in the full line position, it is apparent that rotation of dial 14 of say motor 6c will result in turning the rotor of motor 6b, the current induced in the stator of motor 6c flowing through wires 12 to stator 9 of motor 6b and causing a turning of rotor 8 thereof, since the latter is connected through wires 11, 30, 55, and 57 to the rotor of motor 6c. Thus, the engines are separately and independently controllable under these conditions, as illustrated diagrammatically in Fig. 2. When the switch 49 is closed to throw switch 51 to the dotted line position, engine 6 is subordinated to engine 7, as illustrated diagrammatically in Fig. 3. Under these conditions, if the engine 6 at the moment the switch 51 is closed happens to be operated at some speed higher or lower than the speed of engine 7, it is promptly synchronized. For example, if engine 6 is turning at say 1200 R. P. M., whereas engine 7 is turning at 1600 R. P. M., engine 6 is promptly speeded up to 1600 R. P. M., because the crank-shaft generator 7d is not only connected with its governor motor 7b and related motor 7c, but also with the governor motor 6b and associated motor 6c. The circuit, based on the assumption that engine 7 is turning at a faster speed than engine 6, as indicated by the turning of the needle 35 at motor 31, is as follows: From the stator 29 of the generator 7d through the wires 30 and 56 through switch 51 and wires 57 to motor 6c, and through wires 12 to stator 9 of motor 6b, whereby to produce a plus adjustment of the governor 6a and accordingly speed up the engine 6. The system is then fully automatic, but is still subject to manual control in these respects: The speed of the engines may be increased or decreased by turning the dial 21, or one may manipulate the dials 14 to obtain the precise crank-shaft angle relationship desired, or one may throw the system out of automatic control instantly by pressing the button 48. It should also be clear from the foregoing description that, whereas the parent application disclosed a system in which the speed of two engines was kept balanced to prevent one from racing due to lack of load, while the other was laboring under added load, the present system is designed to have the speed of the subordinate engine or engines matched with the speed of the master engine, and, whereas the parent application disclosed a system in which the crank-shafts of two engines were either maintained at the same instantaneous phase angle or at some desired phase angle relationship, the present system discloses the keeping of one or more subordinate engines in step with the master engine. This present system is therefore applicable to a great variety of uses. For example, a number of pump driving engines or motors in oil and other pipe lines can be "tied together" and kept operating in step so that the surges occur in a relationship favorable to greatly increased gallonage while still operating the line well within a prescribed safety limit. Still another example is the use of the system in connection with the various parts of a paper making machine so as to control more accurately than otherwise the thickness and uniformity of stock and eliminate danger of tearing the web, etc. There are still other uses too numerous to be described here, many of which will no doubt become at once apparent to those skilled in the various arts where problems that demand the application of this sort of a system are present.

Figure 3:
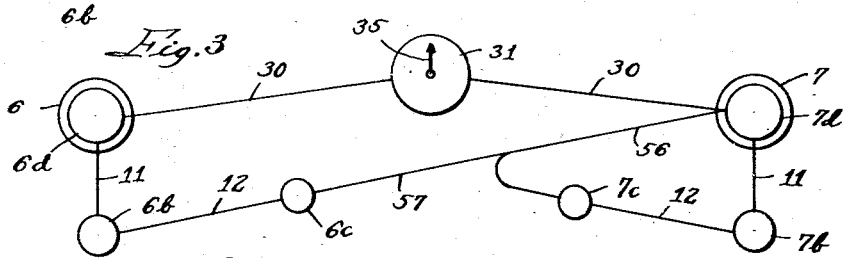
Fig. 3 is a similar skeleton diagram illustrating synchrophased operation of the two engines.
Figure 2A:
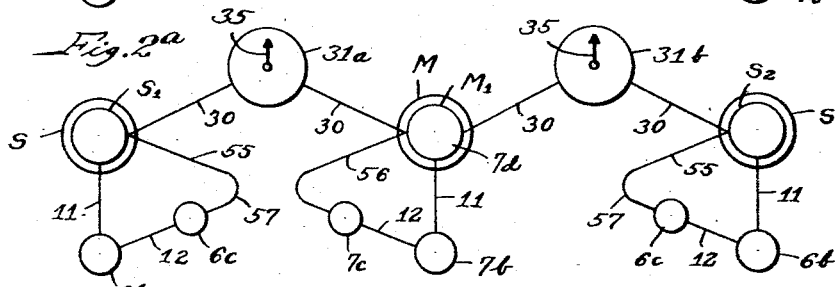
Figs. 2a and 3a are other skeleton diagrams corresponding respectively to Figs. 2 and 3, but illustrating a master engine and two subservient engines instead of only one.
Figure 3A:
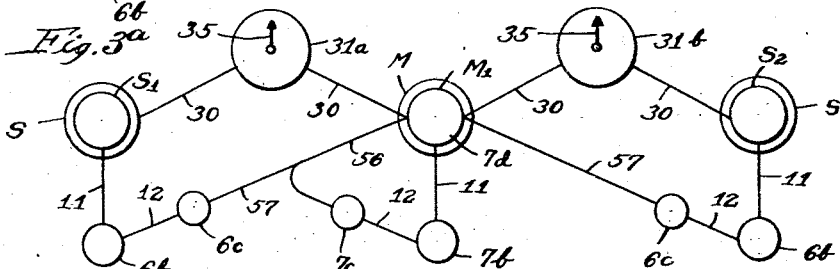

In Figs. 2a and 3a I have illustrated diagrammatically similar conditions to those illustrated in Figs. 2 and 3, but applied to a system where there are two subordinate engines or motors and one master engine or motor. $M_1$ designates the crank-shaft selsyn of the master unit M and $S_1$ and $S_2$ designate the crank-shaft selsyns of the two subordinate units, S, $M_1$ corresponding to the generator or position-transmitter 7d, previously described, and $S_1$ and $S_2$ each corresponding to the generator or position-transmitter 6d, previously described. The differential selsyns 31a and 31b each correspond to the motor 31, previously described, and serve to indicate difference in speed, if any, between the units and also phase angle relationship. The other motors have been marked 6c, 7c, 6b, and 7b to correspond with the numbering of corresponding motors in Figs. 2 and 3. In Fig. 2a, the individual units M and S are separately controlled by their governors similarly as the units 6 and 7 in Fig. 2, and any difference in speed or difference in phase angle is shown at 31a and 31b. By cross-connecting the governor control motors of the subordinate units with the master unit, as in Fig. 3a, the subordinate units S are kept in step with the master unit M similarly as the unit 6 in Fig. 3 is kept in step with the unit 7.

Figure 3B:
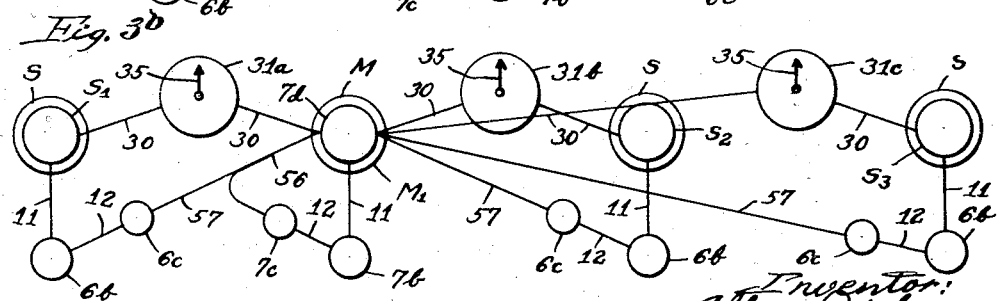
Fig. 3b is still another skeleton diagram similar to Fig. 3a, but showing a further extension of the principle of synchrophasing where there is one master engine and three subservient engines.

Fig. 3b is similar to Fig. 3a and illustrates the synchrophasing of three subordinate units S with the master unit M in a similar manner, and, of course, while only three subordinate units are shown, any desired number of subordinate units may be kept in step with a master unit, in accordance with the present invention.

While the invention has been described and illustrated as a completely electrical system of synchrophasing, it should be understood that all mechanical apparatus for producing similar operations herein obtained by electrical apparatus are considered as coming properly within the spirit and scope of the present invention. An example of this is the electrical coupling herein of two differential selsyn motors 6b and 6c, and 7b and 7c, either of which pairs might be replaced by differential gearing in an analogous mechanical apparatus, a differential self-synchronizing electric motor being the equivalent of a differential gear device, the same being a means for transmitting motion differentially. The appended claims have accordingly been drawn with a view to covering all legitimate modifications and adaptations.

I claim:

1. In combination, a plurality of prime movers, one of which is adapted to operate as a master and the other or others subordinate thereto, governors for the master and subordinate prime movers each having a speed adjustment, means driven in synchronism with the prime movers to indicate their relative speeds, manually operable means for operating said speed adjustments, each of those for the subordinate prime movers being operable alone to adjust the speed of its associated prime mover into synchronism with the master, the first-mentioned means including a differential having a central movable indicating element which indicates when motionless the synchronism of the prime movers and their instantaneous phase relationship, and the last-mentioned means being operable simultaneously to adjust the prime movers into a desired phase relationship, and means responsive to a deviation from a preselected phase relation between said subordinates and said master prime mover for effecting a compensating adjustment in said governor speed adjustments to restore the phase relation to its preselected value.

2. In combination, a plurality of prime movers, one of which is adapted to operate as a master and the other or others subordinate thereto, governors for the master and subordinate prime movers each having a speed adjustment, differential devices each connected on opposite sides with the master and a subordinate prime mover to operate in synchronism therewith and having a central movable indicating element to indicate any relative speed between said prime movers, and differential devices connected on opposite sides of each of the aforesaid differentials to the related prime movers, one of which devices is arranged in the event of relative speed between the master and a subordinate prime mover to effect a compensating adjustment of the governor for the subordinate prime mover to restore synchronism and a desired phase relationship.

3. The combination set forth in claim 2, including two manually operable means in connection with each first mentioned differential for operating the related speed adjustments individually or simultaneously, the central movable indicating element of the differential serving to indicate when motionless the synchronism of the prime movers and their instantaneous phase relationship, and the last-mentioned devices being operable to adjust the prime movers into a desired phase relationship.

4. In combination, a plurality of rotating members to be operated in synchronism and a certain phase relationship so that one of said members operates as a master and the other or others are subordinate thereto, separate speed controls for the master and subordinate members, differential devices each connected on opposite sides with the master and a subordinate member to operate in synchronism therewith and having a central movable indicating element to indicate any relative speed between said members, and differential devices connected on opposite sides of each of the aforesaid differentials to the related rotating members, one of which devices is arranged in the event of relative speed between the master and a subordinate member to effect a compensating adjustment of the speed control for the subordinate member to restore synchronism and a desired phase relationship.

5. The combination set forth in claim 4, including two manually operable means in connection with each first mentioned differential for operating the correlated speed controls individually or simultaneously, the central movable indicating element of the differential serving to indicate when motionless the synchronism of the members and their instantaneous phase relationship, and the last-mentioned devices being operable to adjust the members into a desired phase relationship.

6. In a synchrophasing system, the combination of a plurality of prime movers, one of which is adapted to operate as a master and the other or others subordinate thereto, an isochronous governor operatively connected with each of the master and subordinate prime movers, a manually operable remote control means for adjusting each of said governors whereby to bring the subordinate prime movers into synchronism and phase with the master, and differential type means whereby the last-mentioned means for each subordinate prime mover is arranged to be connected with the master prime mover to effect compensating governor adjustment of the subordinate governors and maintain a desired phase relationship.

7. In a synchrophasing system, the combination of a plurality of prime movers, one of which is adapted to operate as a master and the other or others subordinate thereto, an isochronous governor operatively connected with each of the master and subordinate prime movers, means whereby said governors are arranged to be automatically adjusted in the event of speed change on the prime movers, and means arranged to effect compensating governor adjustment of the subordinate prime mover or prime movers in the event of a governor adjustment of the master prime mover so as to maintain a predetermined phase relationship.

8. A system of controlling phase relationship of prime movers and other rotating members comprising governors for a master prime mover and one or more subordinate prime movers, each governor having a speed adjustment, means driven in synchronism with the prime movers to indicate relative speeds between each subordinate prime mover and the master, means associated with the synchronously driven means to effect a change in governor speed adjustment whereby to adjust and maintain desired phase relationship between the prime movers, manually operable means for actuating the speed adjustments of the several governors, either of said manually operable means being operable alone to adjust a subordinate prime mover into synchronism and desired phase relationship with the master, the means for indicating the relative speeds of the prime movers including an element which when motionless indicates the synchronism of the prime movers whose relative speeds are to be indicated, and also indicates their instantaneous phase relationship, the manually operable means for adjusting each governor to bring the subordinate prime movers or rotating members into synchronism and phase with the master being remote control means, and means whereby each subordinate remote control means is arranged to be connected with the master governor to effect compensating governor adjustment of the subordinate prime movers in the event of an automatic governor adjustment of the master.

9. In combination, a master prime mover and one or more subordinate prime movers, a source of alternating current supply, A. C. position generators synchronously driven by the associated prime movers and excited from said source, a governor for each of said prime movers having a speed adjustment and two differential A. C. position motors in remote relationship to one another but electrically connected with one another and with said generators for excitation, said motors comprising stators and rotors, one of said rotors being mechanically connected with the governor speed adjustment and the other rotor being manually rotatable whereby to effect remote manual control of the related prime mover, a device between the master and each subordinate prime mover operable differentially to indicate relative speed or synchronism as well as phase relationship during synchronism, said devices being connected so as to be driven from opposite sides of its differential mechanism by the master and subordinate prime movers, and means for electrically interconnecting the motors of each subordinate prime mover with the generator of the master whereby to maintain a desired phase relationship in the system.

10. In combination, a master prime mover and one or more subordinate prime movers, a source of alternating current supply, A. C. position generators synchronously driven by the associated prime movers and excited from said source, a speed control means for each prime mover and two differential A. C. position motors in remote relationship to one another but electrically connected with one another and with said generators for excitation, said motors comprising stators and rotors, one of said rotors being mechanically connected with the speed control means and the other rotor being manually rotatable to effect remote manual control of the related prime mover, and a third A. C. position motor comprising a rotor and stator, one of which is electrically connected with the master generator and the other of which is electrically connected with the subordinate generator, and means for electrically interconnecting one or more sets of motors related to subordinate prime movers with the master generator, whereby to maintain the subordinate prime movers in a desired phase relationship with the master.

11. In combination, a master prime mover and one or more subordinate prime movers, a source of alternating current supply, A. C. position generators synchronously driven by the associated prime movers and excited from said source, a speed control means for each prime mover and two differential A. C. position motors in remote relationship to one another but electrically connected with one another and with said generators for excitation, said motors comprising stators and rotors, one of said rotors being mechanically connected with the speed control means and the other rotor being manually rotatable to effect remote manual control of the related prime mover, an electrical device between each subordinate prime mover and the master operating differentially to indicate relative speed or synchronism as well as phase relationship during synchronism, said device being connected on opposite sides to the generators of the master and subordinate prime movers, and means for electrically interconnecting one or more sets of motors related to subordinate prime movers with the master set, whereby to maintain the subordinate prime movers in a desired phase relationship with the master.

12. In a control system of the character described, a master prime mover and one or more subordinate prime movers adapted to be kept in a desired phase relationship with the master, a source of alternating current supply, A. C. position generators synchronously driven by the associated prime movers and excited from said source, speed control means for said master and subordinate prime movers, an A. C. position motor associated with each speed control means and electrically connected with the associated generator, the same comprising a stator, and a rotor operatively connected with the speed control means, a manual control A. C. position motor electrically connected with each of said first motors and comprising a stator, and a rotor manually rotatable, and means for interchangeably electrically connecting the related motors and generators for independent manual control of the various prime movers, or electrically connecting the motors associated with the subordinate prime movers with the generator associated with the master prime mover so as to maintain the subordinate prime movers in a desired phase relationship with the master prime mover.

13. A synchrophasing system comprising in combination with a plurality of prime movers, one of which constitutes the master and the other or others subordinate prime movers, a source of alternating current supply speed control means for the master and subordinate prime movers, electric motors for operating the speed control means each having a pair of relatively rotatable electromagnetic elements, one of which is mechanically connected with the associated speed control means, remote control devices for the speed control means each comprising an electric motor having a pair of relatively rotatable electromagnetic elements, one of which is adapted to be turned manually to effect corresponding rotation of the adjusting motor of the associated speed control means, generators excited from the aforesaid source and driven in synchronism with the master and subordinate prime movers each connected electrically with one of the elements of the related speed control adjusting motor, means electrically connecting the master control motor with the master generator and master speed control motor, and means for electrically connecting each subordinate control motor with the master generator, its subordinate speed control motor and its subordinate generator, whereby the subordinate prime movers are kept in a desired phase relationship with the master prime mover.

14. A synchrophasing system as set forth in claim 13, including means interconnecting the remote control devices for the master and a subordinate prime mover for simultaneous adjustment in either direction, said means being so constructed as to permit independent adjustment of either device in either direction without disturbing the adjustment of the other device.

15. A synchrophasing system comprising in combination with a plurality of prime movers, one of which constitutes the master and the other or others subordinate prime movers, a source of alternating current supply speed control means for the master and subordinate prime movers, electric motors for operating the speed control means each having a pair of relatively rotatable electromagnetic elements, one of which is mechanically connected with the associated speed control means, remote control devices for the speed control means each comprising an electric motor having a pair of relatively rotatable electromagnetic elements, one of which is adapted to be turned manually to effect corresponding rotation of the adjusting motor of the associated speed control means, generators excited from the aforesaid source and driven in synchronism with the master and subordinate prime movers each connected electrically with one of the elements of the related governor adjusting motor, a differential device between each subordinate prime mover and the master driven from opposite sides by the subordinate and master prime movers and including a rotatable pointer, the rotation of which indicates relative speed and the position when stationary indicates synchronism and phase relationship between said prime movers, means electrically connecting the master control motor with the master generator and master governor motor, and means for electrically connecting each subordinate control motor with the master generator, its subordinate speed control motor and its subordinate generator, whereby the subordinate prime movers are kept in a desired phase relationship with the master prime mover.

16. A synchrophasing system as set forth in claim 15, including means interconnecting the remote control devices for the master and a subordinate prime mover for simultaneous adjustment in either direction, said means being so constructed as to permit independent adjustment of either device in either direction without disturbing the adjustment of the other device.

17. A synchrophasing system comprising in combination with a master prime mover and one or more subordinate prime movers adapted to operate in synchronism and a desired phase relationship with the master, throttle control devices for the master and subordinate prime movers, a source of alternating current supply, electric motors for operating the throttle control devices each having a pair of relatively rotatable electromagnetic elements, one of which is connected with the associated throttle control device, remote control devices for the throttle control devices each comprising an electric motor having a pair of relatively rotatable electromagnetic elements, one of which is adapted to be turned manually to effect corresponding rotation of the related electromagnetic element in the throttle adjusting motor associated therewith, generators excited from the aforesaid source and driven in synchronism with the master and subordinate prime movers, each connected electrically with one of the elements of the related throttle adjusting motor, means electrically connecting the master control motor with the master generator and master throttle motor, and means for electrically connecting each subordinate control motor with the master generator, its subordinate governor motor and its subordinate generator, whereby the subordinate prime movers are kept in synchronism and a desired phase relationship with the master prime mover.

18. A synchrophasing system comprising in combination with a master prime mover and one or more subordinate prime movers adapted to operate in synchronism and a desired phase relationship with the master, throttle control devices for the master and subordinate prime movers, a source of alternating current supply electric motors for operating the throttle control devices each having a pair of relatively rotatable electromagnetic elements, one of which is connected with the associated throttle control device, remote control devices for the throttle control devices each comprising an electric motor having a pair of relatively rotatable electromagnetic elements, one of which is adapted to be turned manually to effect corresponding rotation of the related electromagnetic element in the throttle adjusting motor associated therewith, generators excited from the aforesaid source and driven in synchronism with the master and subordinate prime movers, each connected electrically with one of the elements of the related throttle adjusting motor, a differential device between the master and each subordinate prime mover driven from opposite sides by the master and subordinate prime movers and including a rotatable pointer, the rotation of which indicates relative speed and the stationary position of which indicates synchronism and phase relationship between the prime movers, means electrically connecting the master control motor with the master generator and master throttle motor, and means for electrically connecting each subordinate control motor with the master generator, its subordinate governor motor and its subordinate generator, whereby the subordinate prime movers are kept in synchronism and a desired phase relationship with the master prime mover.

19. In combination, a master prime mover and one or more subordinate prime movers, a source of alternating current supply, A. C. position generators synchronously driven by the associated prime movers and excited from said source, an electrical synchronism and phase indicator between the master and each subordinate prime mover comprising stator and rotor elements, one of which is electrically connected with the master generator and the other with the subordinate generator, an isochronous governor for each of said prime movers having a speed adjustment, means for operating the speed adjustment for the master governor, and a differential self-synchronizing motor for operating the speed adjustment of each subordinate governor, each of said motors comprising rotor and stator elements, one of which is electrically connected with the associated subordinate generator and the other of which is connected with the master generator.

20. In a synchrophasing system, the combination of a plurality of prime movers, one of which is adapted to operate as a master and the other or others subordinate thereto, speed control means operatively connected with each of the master and subordinate prime movers, a manually operable remote control means for adjusting each of the speed control means whereby to bring the subordinate prime movers into synchronism and phase with the master, and differential type means whereby the last-mentioned means for each subordinate prime mover is arranged to be connected with the master prime mover to effect compensating adjustment of the subordinate speed control means and maintain a desired phase relationship.

21. In combination, a plurality of prime movers, one of which is adapted to operate as a master and the other or others subordinate thereto, speed control means for the master and subordinate prime movers and a differential self-synchronizing electric motor for operating the same, generators driven in synchronism with the master and subordinate prime movers, one or more differential self-synchronizing electric motors each electrically connected through its stator with one of said master or subordinate generators and through its rotor with the other of said generators, said motors each having an indicating needle turning with the rotor to indicate relative speed between each subordinate prime mover and the master, said generators also constituting sources of electrical current supply for the first mentioned motors, and means providing electrical connections between the master generator and the motors for the speed control means of the subordinate prime movers associated with the other generators, and other differential self-synchronizing electric motors each electrically connected in series with a motor operating speed control means and having means for manually rotating the rotor thereof, the indicating needle or needles operated by the second named differential motor or motors serving to indicate when motionless the synchronism of subordinate prime movers with the master and their instantaneous phase relationship, and the last-mentioned means being operable to adjust subordinate prime movers into a desired phase relationship with the master.

22. In combination, a plurality of rotatable prime movers to be operated in synchronism and a certain phase relationship so that one of said prime movers operates as a master and the other or others as subordinate thereto; an individually adjustable speed control governor associated with each of said prime movers; a differential position-receiver drivingly connected to each of said adjustable governors; a position-transmitter driven by each of said prime movers; means electrically connecting one side of each of said differential position-receivers with the position-transmitter driven by its associated prime mover; means electrically connecting the other side of each of the differential position-receivers of the subordinate prime movers with the position-transmitter associated with the master prime mover; and means including an intermediate differential type position-transmitter electrically connecting the other side of the remaining one of the differential position-receivers, which is associated with the master prime mover, with the position-transmitter driven by the master prime mover.

23. In combination, a plurality of rotatable members to be operated in synchronism and a certain phase relationship so that one of said members operates as a master and the others as subordinate thereto; an individually adjustable speed control device for each of said members; a differential position-receiver drivingly connected to each of said adjustable speed control devices; a position-transmitter driven by each of said members; means electrically connecting one side of each of said differential position-receivers with the position-transmitter driven by its associated member; means electrically connecting the other side of each of the differential position-receivers of the subordinate members with the position-transmitter associated with the master member; and means electrically connecting the other side of the remaining differential position-receiver, which is associated with the master member, with the position-transmitter driven by the master member.

ALBERT KALIN.

CERTIFICATE OF CORRECTION.

Patent No. 2,205,265. June 18, 1940.

ALBERT KALIN.

It is hereby certified that error appears in the printed specification of the above numbered patent requiring correction as follows: Page 3, second column, line 41, after the word "motor" insert --or position-receiver--; page 4, first column, line 23, claim 1, strike out "simultaneously"; page 6, first column, lines 12 and 21, claim 15, for "governor" read --speed control--; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.